United States Patent
Amon et al.

[11] Patent Number: 5,941,151
[45] Date of Patent: Aug. 24, 1999

[54] METHOD AND APPARATUS FOR DETERMINING A WORKPIECE'S SURFACE POSITION

[75] Inventors: Anthony A. Amon, San Jose; Anthony M. Rogers, Livermore, both of Calif.; Michael A. Morasci, Bothell, Wash.

[73] Assignee: Acuson, Corporation, Mt. View, Calif.

[21] Appl. No.: 08/538,957

[22] Filed: Oct. 4, 1995

[51] Int. Cl.$^6$ ............................................. B26D 5/06
[52] U.S. Cl. ...................... 83/360; 83/168; 83/875; 409/186; 409/193; 451/10
[58] Field of Search ............... 83/360, 875, 876, 83/877, 878, 99, 168, 372; 409/186, 187, 188, 193, 194, 218; 125/13.03; 451/9, 10

[56] References Cited

U.S. PATENT DOCUMENTS

| | | | |
|---|---|---|---|
| 2,371,358 | 3/1945 | Sekella | 83/372 |
| 2,607,421 | 8/1952 | Anderson | 83/372 |
| 3,601,572 | 8/1971 | Check et al. . | |
| 3,822,959 | 7/1974 | Tabard . | |
| 3,841,199 | 10/1974 | Jepson et al. . | |
| 3,841,780 | 10/1974 | Mengeringhausen . | |
| 3,969,615 | 7/1976 | Bowers et al. . | |
| 4,008,639 | 2/1977 | Hasegawa | 83/372 |
| 4,203,691 | 5/1980 | Nishimura et al. . | |
| 4,657,451 | 4/1987 | Tanaka . | |
| 4,784,541 | 11/1988 | Umehara et al. | 409/193 |
| 4,786,220 | 11/1988 | Fildes et al. | 409/194 |
| 4,826,370 | 5/1989 | Conradsson . | |
| 4,954,022 | 9/1990 | Underwood et al. . | |
| 5,025,592 | 6/1991 | Yamamori et al. | 451/9 |
| 5,094,574 | 3/1992 | Nishigai et al. | 409/218 |
| 5,217,336 | 6/1993 | LeBlanc | 409/218 |

FOREIGN PATENT DOCUMENTS

| | | | |
|---|---|---|---|
| 61-30355 | 2/1986 | Japan | 409/186 |
| 709326 | 1/1980 | U.S.S.R. . | |

*Primary Examiner*—M. Rachuba
*Assistant Examiner*—Sean Pryor
*Attorney, Agent, or Firm*—Morrison & Foerster LLP

[57] ABSTRACT

A method and apparatus for determining a workpiece's surface position. One embodiment of the invention includes two conductive bodies that are insulated from each other. During a surface position determining operation, one of these bodies has a first potential, while the other body has a second potential. These bodies are then moved towards a conductive surface of the workpiece, until both of these bodies are electrically detected to contact the surface. Finally, the distance that one of these bodies traverses is used to identify the position of the surface of the workpiece.

21 Claims, 8 Drawing Sheets

METHOD AND APPARATUS FOR DETERMINING A WORKPIECE'S SURFACE POSITION

The present invention is directed towards a method and apparatus for determining a workpiece's surface position.

BACKGROUND OF THE INVENTION

Figure 1:
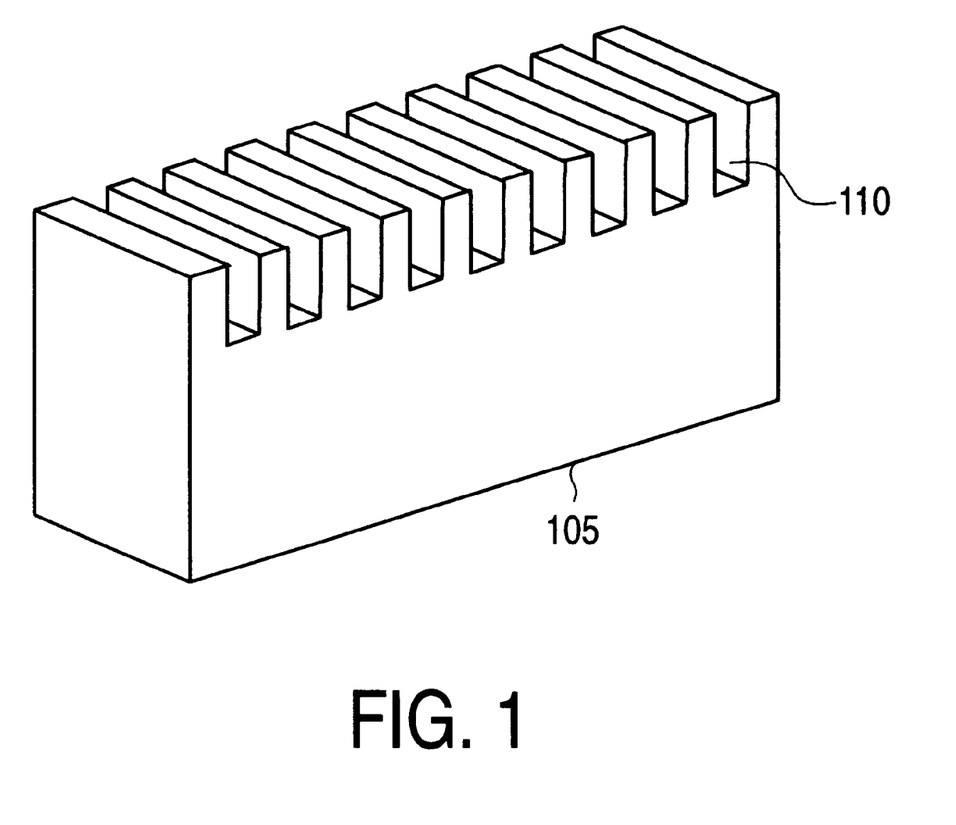
FIG. 1 presents a perspective view of a diced phased array transducer.

Often, the exact location of a surface of a workpiece is needed in order to allow a machine to accurately operate on the workpiece. For instance, in the field of phased array transducers, the determination of the exact location of a transducer's surface is crucial. FIG. 1 provides an example of a transducer 105 that has a surface diced (i.e., cut) into a number of kerfs 110 (i.e., slots 110) by a saw blade. The width of the saw blade determines the width of the diced kerfs.

In addition, the operation of the saw blade determines the depth of each kerf. Moreover, uniform kerf depths are crucial for establishing consistent acoustic response throughout a transducer. The consistency of the kerf depths depends on the transducer surface position that is supplied to the dicing machine. For example, if the dicing machine is programmed for a greater or lesser height than the actual transducer height, the dicing machine will dice kerfs that are respectively too shallow or too deep. Therefore, the accurate determination of the transducer surface position is crucial for the proper operation of the transducer, because the dicing machine needs accurate surface position data to produce consistent kerf depths, which provide consistent acoustic response throughout a transducer.

One prior art method for supplying surface position information to the dicing machine involves manually (1) measuring the height of a transducer at a finite number of random points, (2) calculating an average transducer height, and (3) entering the average transducer height into the dicing program. Since no two transducers are the same, custom measurements, calculations, and software modifications have to be performed for each transducer. Therefore, this average height calculation method is rather time consuming.

Furthermore, this prior art technique is inadequate for a transducer whose height substantially varies along its surface. Finally, this prior art method is susceptible to (1) transducer mounting errors (e.g., errors due to debris underneath a portion of the transducer); (2) human errors (e.g., errors in calculating the average height value or in programming the equipment); (3) mounting unit errors (e.g., errors due to the expansion or contraction of the mounting unit); and (4) blade wear errors (e.g., errors due to the gradual reduction of the blade diameter).

U.S. Pat. No. 4,954,022 discloses another prior art method for determining the position of a surface of a workpiece. Under this approach, "in order to assure uniform depth cuts which are made at a predetermined angle to the surface, the workpiece is insulated from the machine tool, and the workpiece and the tool of the machine tool are connected to an electric circuit which senses the electrical contact between the workpiece and the tool and thereby records the sensed or exact position of the surface of the workpiece." Column 2, lines 36–43. Unfortunately, this prior art approach requires the workpiece to be connected to the power supply. Establishing this connection can be difficult depending on the nature of the workpiece (e.g., the size and shape of the workpiece). In addition, this prior art method requires an entirely conductive workpiece, because it connects the workpiece to the power supply.

U.S. Pat. No. 4,826,370 discloses another prior art method for determining the position of a surface of a workpiece. In particular, this patent discloses an indicator device which on one side contacts the workpiece and on another side contacts the machine tool, in order to establish a circuit between the workpiece, the machine, the machine tool, and a power supply. Thus, this prior art method also requires an entirely conductive workpiece to be connected to the power supply.

Consequently, there is a need in the art for a method and apparatus for determining the position of a surface of a workpiece that is not connected to a power supply and is not entirely conductive. There is also a need in the art for a method and apparatus for accurately determining transducer height values in real-time, in order to obtain uniform kerf depths, which thereby establish consistent acoustic response throughout the transducer.

SUMMARY OF THE INVENTION

The present invention provides a method and apparatus for determining a workpiece's surface position. One embodiment of the present invention includes two conductive bodies that are insulated from each other. During a surface position determining operation, one of these bodies has a first potential, while the other body has a second potential. These bodies are then moved towards a conductive surface of the workpiece, until both these bodies are electrically detected to contact the surface. Finally, the distance that one of these bodies traverses is used to identify the position of the surface of the workpiece.

BRIEF DESCRIPTION OF THE DRAWINGS

The novel features of the invention are set forth in the appended claims. However, for purpose of explanation, one embodiment of the invention is set forth in FIGS. 2–8.

DETAILED DESCRIPTION OF THE INVENTION

The invention provides a method and apparatus for determining a workpiece's surface position. In the following description, numerous details are set forth for purpose of explanation. However, one of ordinary skill in the art would realize that the invention may be practiced without the use of these specific details.

One embodiment of the invention includes two conductive bodies that are insulated from each other. During a surface position determining operation, one of these bodies has a first potential, while the other body has a second potential. These bodies are then moved towards a conductive surface of a workpiece, until both these bodies are electrically detected to contact the surface. Finally, the distance that one of these bodies traverses (until both these bodies are electrically detected to contact the surface) is used to identify the position of the surface of the workpiece.

FIGS. 2–5 set forth another embodiment of the invention. This embodiment of the invention is a surface position determining apparatus that is adapted to operate with a typical dicing machine (such as a Kulicke and Soffa, model no. 782, precision dicing system), in order to perform both a dicing operation and a surface sensing operation on a conductive surface of a workpiece. As shown in these figures, surface position determining apparatus 115 includes a shroud 120, a blade 125 (shown particularly cut away in FIG. 2), a contact arm 130, an air cylinder 135, a compression spring 140, a first air passageway 145, and a second air passageway 150.

Figure 2:
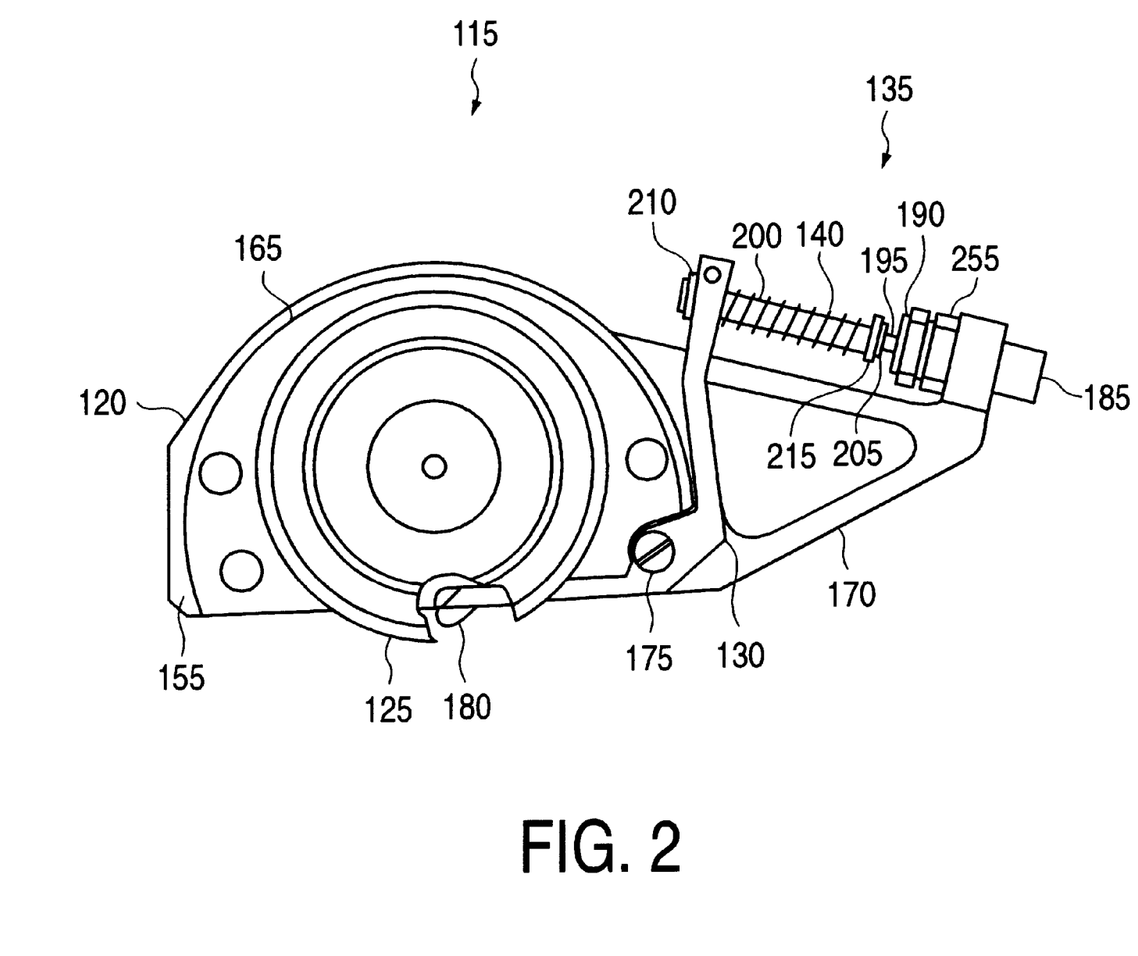
FIG. 2 presents a frontal view of one embodiment of the present invention.
Figure 3:
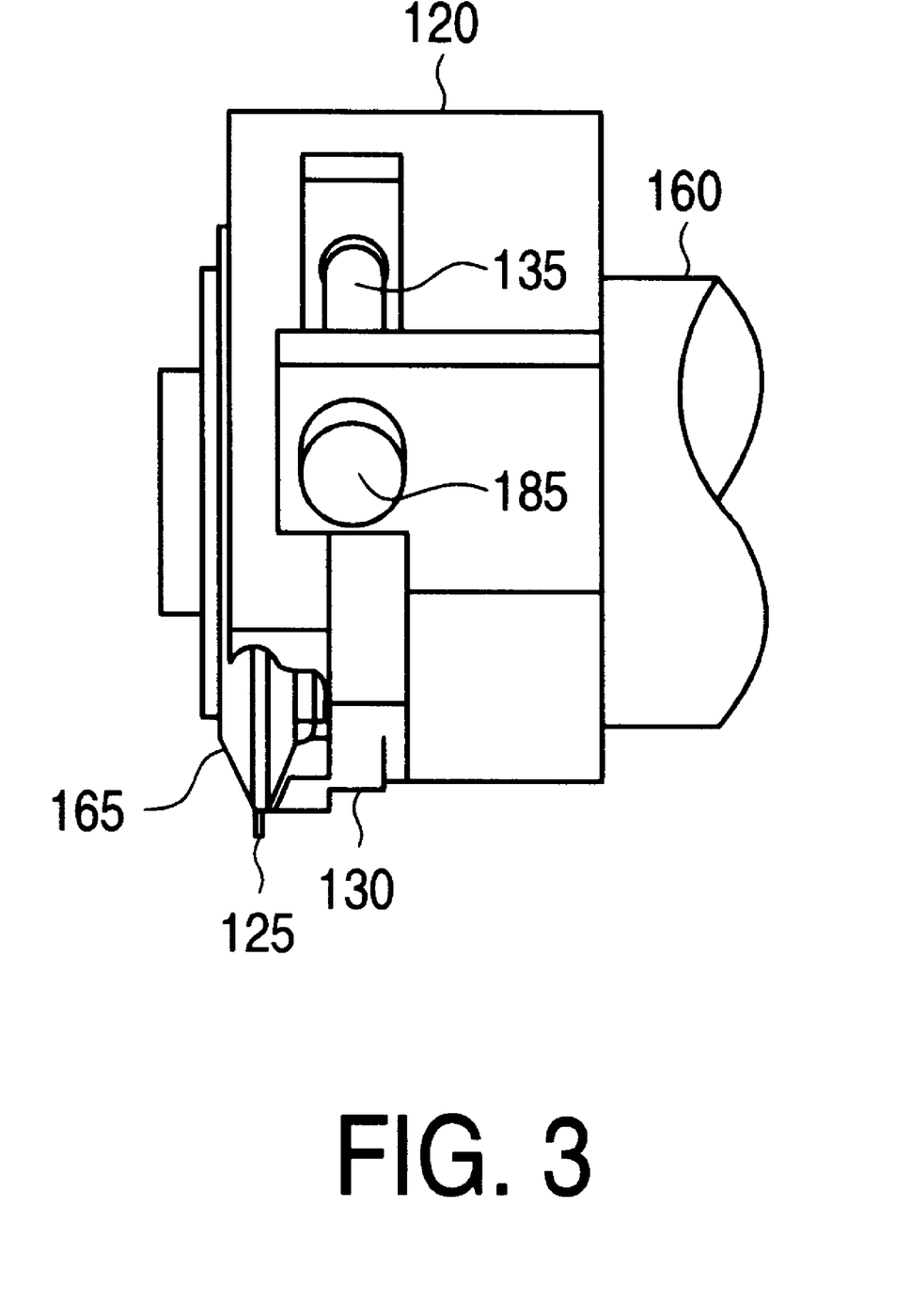
FIG. 3 presents a cross-sectional view of the surface position detecting apparatus of FIG. 2.
Figure 5:
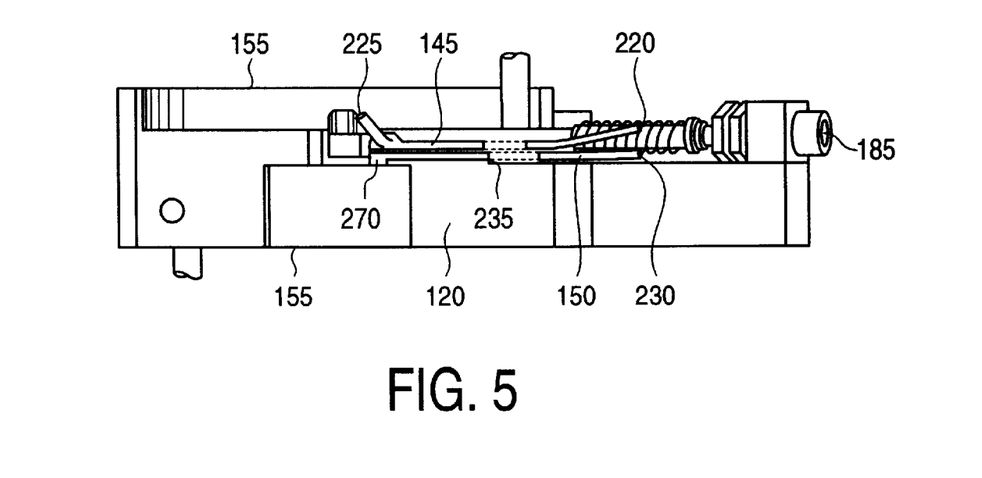
FIG. 5 presents a bottom side view of the surface position detecting apparatus of FIG. 2.

Shroud 120 is manufactured from a non-conductive material, such as acetal resin (which is sometimes sold under the brand name DELRIN). As shown in FIGS. 2 and 5, this shroud has a housing unit 155 and a mounting unit 170. On the backside of the housing unit 155, shroud 120 connects to spindle 160 of a dicing machine, and thereby connects apparatus 115 to the machine. As further shown in these figures, the front side of housing unit 155 houses blade 125, which operatively and electrically connects to spindle 160. The front side of the housing unit and the blade are then covered by shroud cover 165.

Figure 4:
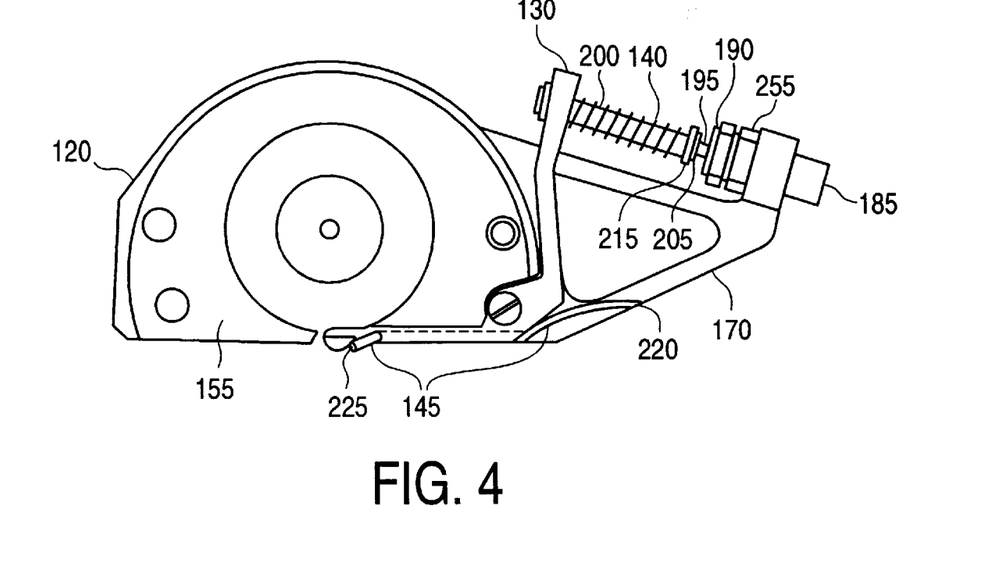
FIG. 4 presents a frontal view of the surface position detecting apparatus of FIG. 2 without the blade and the shroud covering.

Surface position determining apparatus 115 also includes contact arm 130, which is recessed behind blade 125. As shown in FIGS. 2 and 4, contact arm 130 connects to shroud 120 via screw 175 and a pivot bored in mounting unit 170. More specifically, contact arm 130 has a first aperture that receives screw 175, in order to pivotally secure the contact arm to a hidden pivot housed in mounting unit 170. The contact arm is hinged off a hidden pivot in order to eliminate the adverse effects of any slurry in the environment (e.g., the adverse effects of a viscous coolant used in the dicing process) on the pivoting of contact arm 130.

The contact arm has a fully retracted, non-operational position and an actuated, operational position. During dicing operations performed by blade 125, contact arm 130 is in its fully retracted position, above and behind the blade, so as to protect itself from any potential damage. However, as further discussed below, during surface sensing operations, contact arm 130 assumes its actuated position by rotating about its pivot so that its curved contact tip 180 is below blade 125. In addition, contact arm 130 is positioned in close proximity to (e.g., 0.06 inches behind) blade 125, in order to enable surface sensing apparatus 115 to perform surface sensing operations close to the edge of the workpiece.

Contact arm 130 also includes a second aperture for receiving air cylinder 135. Clip 210 affixes to one end of air cylinder 135 in order to prevent this cylinder from separating from the contact arm. The other end of air cylinder 135 is inserted through an aperture in mounting unit 170 and is held in this position by bolt 255. As shown in FIGS. 2 and 4, this air cylinder includes (1) input port 185 for receiving pressurized air from an external air passageway, (2) output port 190 for receiving pressurized air from the input port, (3) piston 195, and (4) hollow shaft 200 for sliding on piston 195 in response to output port 190 applying air to its flange 205. As further elaborated below, the application of pressurized air to the air cylinder's input port 185 causes hollow shaft 200 to slide on piston 195 and thereby rotate (i.e., actuate) contact arm 130 into its actuated operating position for a surface sensing operation.

As further shown in FIGS. 2 and 4, surface position determining apparatus 115 also includes compression spring 140. The coils of this spring surround shaft 200 of air cylinder 135. One end of this spring abuts contact arm 130, while its other end abuts washer 215, which itself abuts flange 205. As further discussed below, compression spring biases contact arm 130 to maintain contact between its tip 180 and the workpiece surface during a surface position determining operation. By removing clip 210 and changing compression spring 140, the biasing force exerted by compression spring 140 on contact arm 130 can be changed to suit the operating conditions.

Finally, as shown in FIG. 5, apparatus 115 includes two passageways for porting air. First passageway 145 is a hollow tube that has two ends extending from the contact arm and a center portion partially embedded in the contact arm. During a surface sensing operation, compressed air is supplied to input port 220 of passageway 145. Through output port 225 of passageway 145, this air is then directed towards the workpiece surface, in order to displace solid and liquid debris (e.g., coolant) from this surface prior to its contact with blade 125.

Second passageway 150 is also a hollow tube that is partially embedded in contact arm 130. During a surface sensing operation, this passageway receives compressed air at its input port 230. Through its output port 235, second passageway 150 then directs this compressed air through a channel 270 defined by the shroud and the backside of the contact arm. In turn, this channel directs the compressed air between the backside of contact arm 130 and the front side of spindle 160, in order to displace any solid or liquid debris that can short arm 130 and spindle 160, and thereby short arm 130 and blade 125 (which electrically connects to the spindle).

Figure 6:
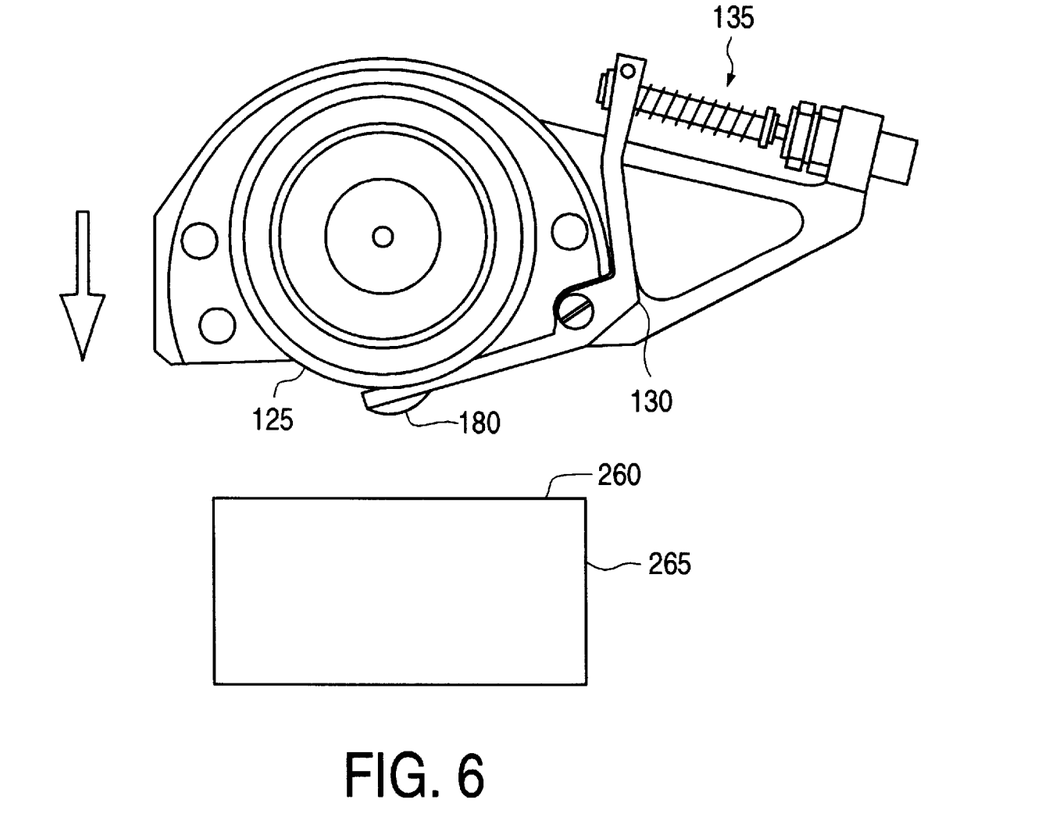
FIGS. 6–8 set forth the operation of the surface position detecting apparatus of FIG. 2.

The operation of surface position determining apparatus 115 will now be described by reference to FIGS. 6–8. As shown in FIG. 6, the operation of apparatus 115 begins when input port 185 of air cylinder 135 receives pressurized air from an external air passageway that connects to it. Output port 190 then directs the pressurized air towards flange 205 which, in turn, causes hollow shaft 200 to slide on piston 195 and thereby actuate contact arm 130. In addition, as hollow shaft 200 slides on piston 195, flange 205 contacts washer 215. This contact then causes washer 215 to apply a biasing force to compression spring 140 which, in turn, exerts this force on contact arm 130. In this manner, the application of pressurized air to the air cylinder's input port 185 causes contact arm 130 to assume its actuated, operational position (shown in FIG. 6), by rotating about its pivot such that its contact tip 180 is approximately 0.125 inches below blade 125.

Figure 9:
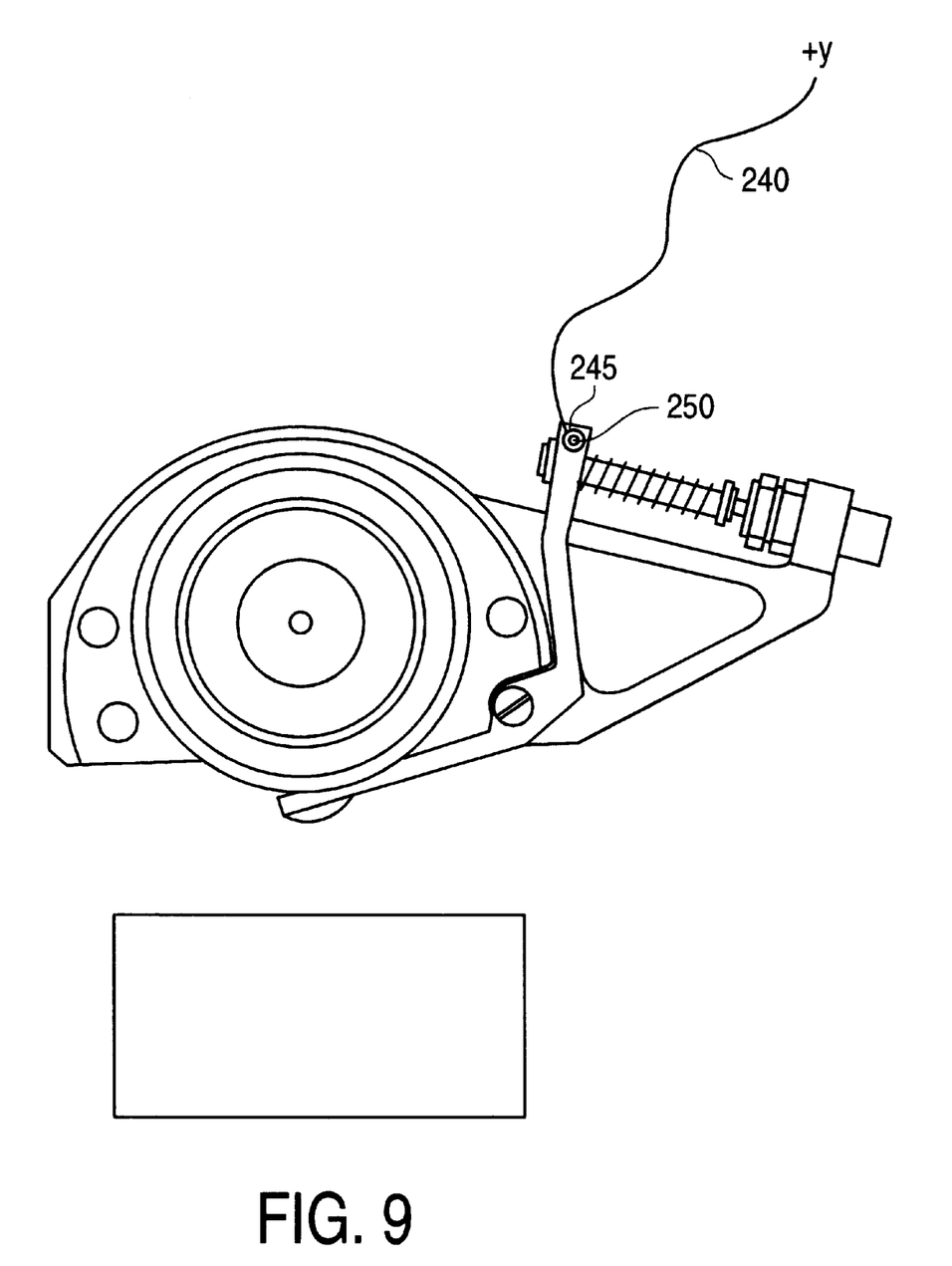
FIG. 9 sets forth one manner for applying a non-zero potential to a contact arm of the apparatus of FIG. 2.

The contact arm and the blade are then placed at two different potentials. In one embodiment of the invention, a differential potential is established by maintaining the spindle, and thereby the blade, at a ground potential, while applying a DC potential of +10 volts to the contact arm. As shown in FIG. 9, one manner for applying a non-zero potential to the contact arm uses (1) a wire 240 that connects to a power supply (not shown), (2) a ring connector 245 that connects to wire 240, and (3) a screw 250 that passes through ring connector 245 to threadedly connect to a third aperture of contact arm 130. Alternative embodiments of the invention establish a differential potential between blade 125 and contact arm 130 by applying a non-zero potential to the blade (via the spindle) and a different non-zero potential to the contact arm.

The machine then lowers the spindle, and thereby moves apparatus 115 towards conductive surface 260 of workpiece 265. As mentioned before, the dicing machine is a typical dicing machine (such as a Kulicke and Soffa, model no. 782, precision dicing system), which has a computer system with a motion meter for recording the position of the spindle of the machine. Thus, as the machine lowers the spindle, it also records the distance that the spindle traverses.

Furthermore, as sensing apparatus 115 approaches the workpiece, compressed air is directed via first passageway 145 towards the workpiece surface, in order to displace from this surface solid and liquid debris (e.g., coolant), which could cause the blade to prematurely short to contact arm 130. Thus, by preventing blade 125 from prematurely shorting to contact arm 130, this displacement operation (that is performed by first passageway 145) prevents sensing apparatus 115 from erroneously detecting the workpiece surface.

Figure 7:
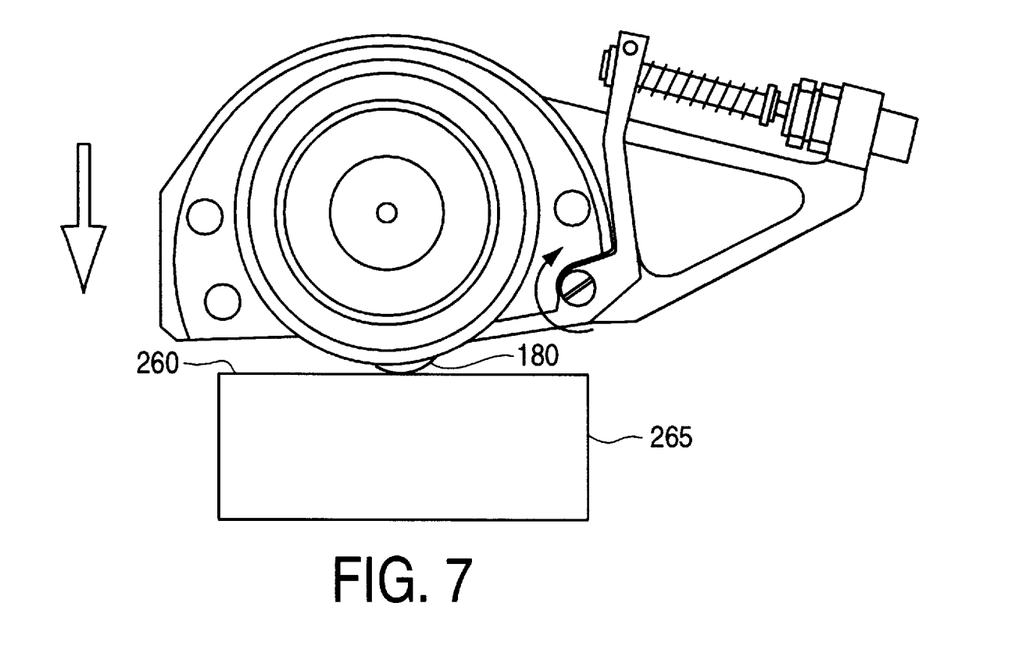

As shown in FIG. 7, curved contact tip 180 of contact arm 130 contacts the workpiece's surface first. The curved contact surface of tip 180 maximizes the surface area of the contact for all possible geometries of the workpiece. In addition, as spindle 160 is lowered further, the hidden pivot (housed in the shroud) and compression spring 140 enable contact arm 130 to rotate in a direction away from the surface of the workpiece while maintaining its contact with the surface (i.e., to rotate relative to the shroud while maintaining its contact with the surface, as apparatus 115 moves closer to the workpiece); this rotational movement is shown in FIG. 7.

More specifically, as spindle 160 is lowered, the contact arm rotates about its pivot, while compression spring 140 biases the contact arm to maintain the contact between its tip 180 and the workpiece surface 260. In this manner, compression spring 140 prevents the contact arm from being over driven and thereby damaging the surface of the workpiece. Moreover, this rotational retracting action of contact arm 130 advantageously serves as a self-cleaning mechanism for cleaning the curved contacting tip of the arm, as the tip rolls on the workpiece surface. In turn, this self-cleaning results in a more reliable circuit path between blade 125 and contact arm 130, when both these conductive bodies contact surface 260.

Figure 8:
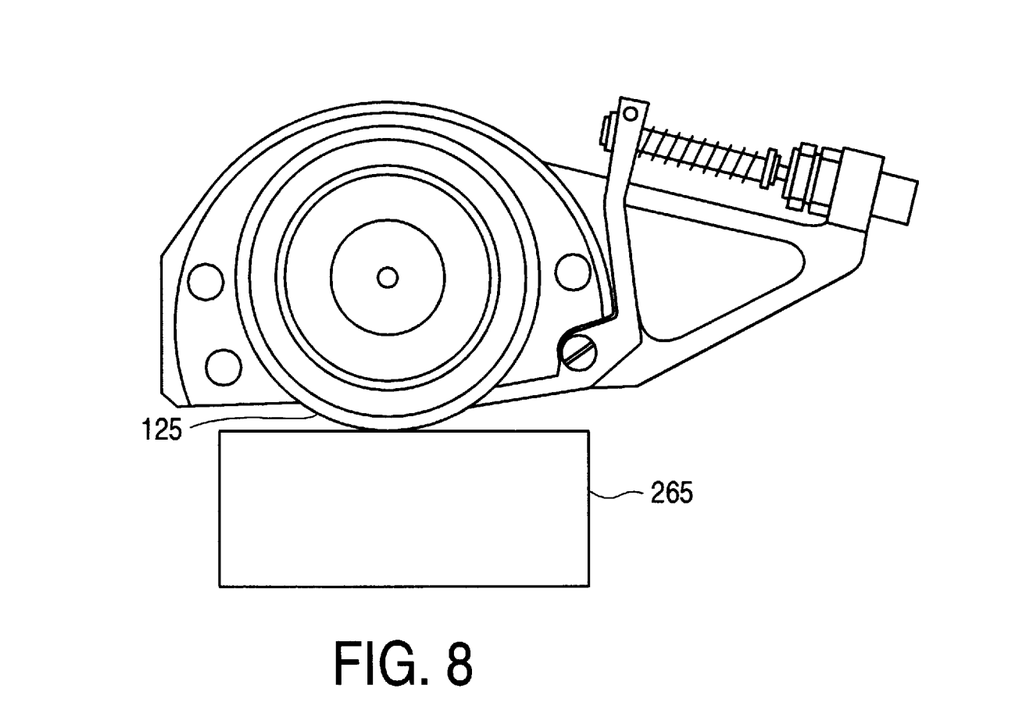

Finally, as shown in FIG. 8, the spindle is further lowered until blade 125 also contacts the workpiece surface. When blade 125 contacts the workpiece's conductive surface 260, a circuit path is established for current to flow through the workpiece surface between the contact arm and the blade. The machine uses a conventional detecting circuit to electrically detect the instance when both the contact arm and the blade contact the workpiece's conductive surface 260.

For example, in one embodiment of the invention, the machine uses a conventional current detector to detect current flow, when the contact arm and the blade contact conductive surface 260. Alternatively, in another embodiment of the invention, the machine connects blade 125 and contact arm 130 to two probes of a continuity checker (not shown), which has a light bulb (not shown) for indicating when a circuit path between its two probes exists. Once the machine detects that both blade 125 and contact arm 130 contact the conductive surface of the workpiece, the machine (1) terminates the linear motion of the spindle, and (2) uses the distance traversed by the spindle (and thereby the blade) to identify the location of the workpiece surface. The cutting operation can then begin.

Figure 10:
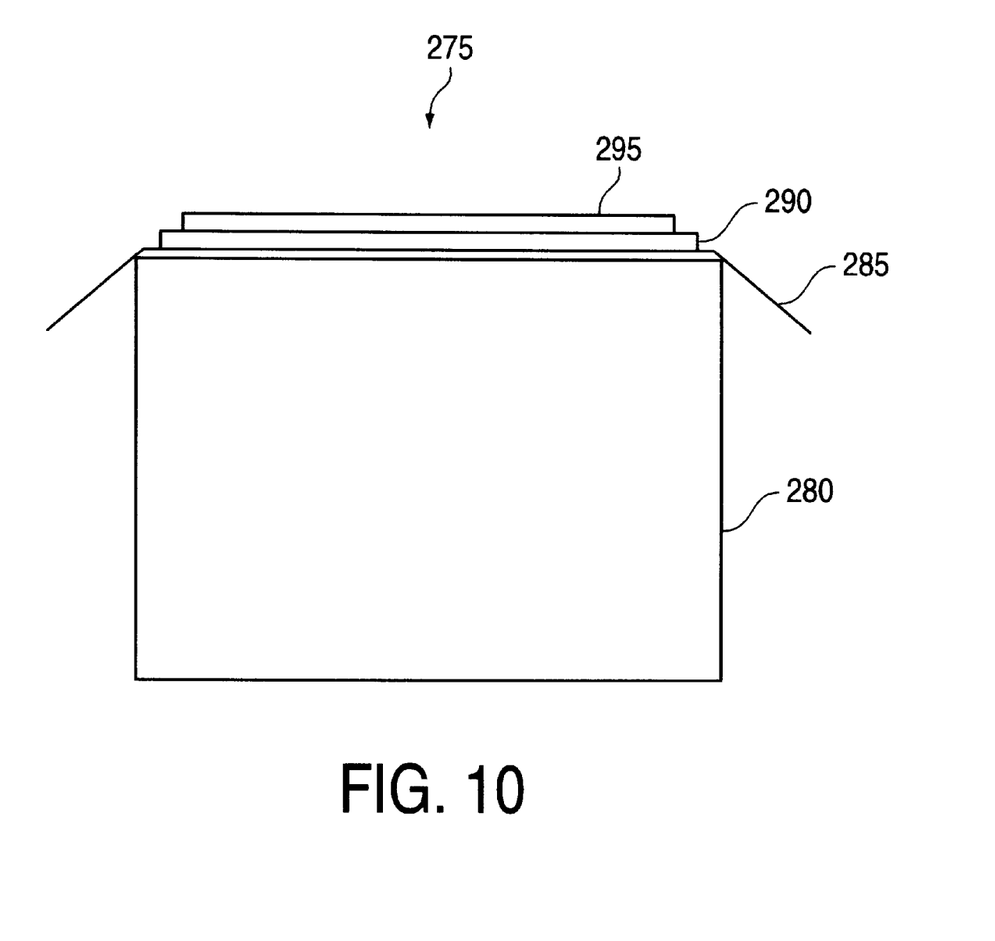
FIG. 10 presents a cross-sectional view of a phased array transducer.

FIG. 10 presents a cross-sectional view of a phased array transducer, which in one embodiment of the invention serves as the workpiece with the conductive surface. As shown in this figure, transducer 275 has a backing block 280 that is composed of aluminum oxide. A flexible circuit 285 is bonded with epoxy to the top of this backing block. In addition, a piezoelectric material 290 (such as lead titanium or lead zirconium) is bonded to the top of the flexible circuit 285. Finally, a gold plated, ceramic layer 295 is bonded on top of the piezoelectric layer 290. This gold-plated layer provides the conductive surface needed to practice the invention.

As apparent from the discussion above, the present invention is advantageous because it provides a method and apparatus for accurately determining in real-time the position of a conductive surface of a workpiece, which is not entirely conductive and is not connected to a power supply. The invention accurately determines a workpiece's conductive surface position by using two conductive bodies to electrically detect the location of the workpiece's conductive surface. In addition, the invention accurately determines the position of a transducer's conductive surface because it eliminates the effects of non-uniformity in the flatness of the transducer, by repeatedly using the dicing blade and a contact arm to electrically detect in real-time the transducer's surface position.

While the invention has been described with reference to numerous specific details, one of ordinary skill in the art would recognize that the invention can be embodied in other specific forms without departing from the spirit of the invention. For example, instead of connecting the contact arm and the blade to the shroud, an alternative embodiment of the invention connects one or both of the conductive bodies to another part of the machine.

Moreover, instead of moving the contact arm and the blade towards the workpiece's conductive surface, an alternative embodiment of the invention causes the invention's two conductive bodies and the workpiece's conductive surface to approach either (1) by moving the workpiece towards the conductive bodies, or (2) by moving the workpiece and the conductive bodies towards each other. In addition, an alternative embodiment of the invention uses a retraction mechanism that, while maintaining the contact arm's contact with the workpiece surface, moves the contact arm away in a linear direction, rather than a rotational direction, from the workpiece surface. Thus, one of ordinary skill in the art would understand that the invention is not to be limited by the foregoing illustrative details, but rather is to be defined by the appended claims.

We claim:

1. An apparatus for detecting position of a conductive surface of a workpiece, said apparatus comprising:
   (a) a first conductive body; and
   (b) a second conductive body insulated from said first conductive body;
   (c) wherein, during a surface position detecting operation of said apparatus,
      (i) said first conductive body has a first potential and said second conductive body has a second potential, and
      (ii) said conductive bodies and said conductive surface approach each other until both said first and second conductive bodies contact said surface to establish a circuit path between said conductive bodies, wherein the distance traversed by said first conductive body before both said first and second conductive bodies contact said surface defines the position of the surface.

2. The apparatus of claim 1 further comprising:
(a) an actuating mechanism coupled to said second conductive body, wherein, during the surface position detecting operation of said apparatus, said actuating mechanism actuates said second conductive body to be closer to said surface than said first conductive body is to said surface,
(b) a retraction mechanism coupled to said second conductive body, wherein, during the surface position detecting operation of said apparatus, said retraction mechanism retracts said second conductive body in a direction away from said surface while maintaining contact with said surface, after said second conductive body contacts said surface but before said first conductive body contacts said surface.

3. The apparatus of claim 2 wherein said retraction mechanism rotates said second conductive body in a direction away from said surface while maintaining its contact with said surface.

4. The apparatus of claim 1 wherein said second conductive body has a curved contact surface for contacting said surface.

5. The apparatus of claim 1 further comprising an air passageway adjacent to said conductive bodies, wherein, during the surface position detecting operation of said apparatus, the air passageway directs air towards said workpiece.

6. The apparatus of claim 1 further comprising an air passageway adjacent to said conductive bodies, wherein, during the surface position detecting operation of said apparatus, the air passageway directs air through said apparatus, in order to remove debris from said apparatus and thereby insulate said first and second conductive bodies.

7. An apparatus for detecting position of a conductive surface of a workpiece, said apparatus comprising:
(a) a first conductive body coupled to a moveable housing; and
(b) a second conductive body coupled to said moveable housing, said second conductive body insulated from said first conductive body;
(c) wherein, during a surface position detecting operation of said apparatus,
(i) said first conductive body has a first potential and said second conductive body has a second potential, and
(ii) said moveable housing approaches said conductive surface of said workpiece until both said first and second conductive bodies contact said surface to establish a circuit path between said conductive bodies, wherein the distance traversed by one of said conductive bodies before both said first and second conductive bodies contact said surface defines the position of the surface.

8. The apparatus of claim 7, wherein said second conductive body is pivotally mounted to said moveable housing.

9. The apparatus of claim 8, wherein said second conductive body (i) is in a retracted, non-operational position above said first conductive body when said apparatus is not performing a surface position detecting operation, and (ii) is in a actuated, operational position below said first conductive body during the surface position detecting operation of said apparatus.

10. The apparatus of claim 8 further comprising:
an air cylinder having a piston, a shaft, and first and second ends;
said air cylinder mounted to said moveable housing at said first end and coupled to said second conductive body at said second end;
wherein, during the surface position detecting operation, said air cylinder receives air which slides said shaft over said piston, said sliding shaft pivotally rotating said second conductive body to an actuated, operational position below the first conductive body.

11. The apparatus of claim 10 further comprising:
a spring surrounding said shaft and abutting said second conductive body;
wherein, during the surface position detecting operation after said second conductive body contacts said surface but before said first conductive body contacts said surface, said second conductive body compressing said spring and said spring providing a biasing force necessary to maintain said second conductive body's contact with said surface while said second conductive body pivotally rotates in a direction away from the surface of the workpiece.

12. The apparatus of claim 8 wherein said second conductive body pivotally rotates with respect to said housing while maintaining its contact with said surface, after said second conductive body contacts said surface but before said first conductive body contacts said surface.

13. The apparatus of claim 12 wherein said second conductive body has a curved contact area for contacting said surface.

14. The apparatus of claim 7 further comprising a hollow tube adjacent to said second conductive body and coupled to said moveable housing, said tube directing air towards said workpiece.

15. The apparatus of claim 7 further comprising a hollow tube adjacent to said first and second conductive bodies, said tube directing air between said first and second conductive bodies to displace debris between said bodies.

16. The apparatus of claim 7, wherein said moveable housing mounts on an apparatus for opening a workpiece, and said first conductive body is an operative tool of the apparatus for operating the workpiece.

17. The apparatus of claim 16, wherein the apparatus for operating a workpiece is a dicing machine, and the first conductive body is a blade for dicing.

18. The apparatus of claim 7 further comprising:
(a) an actuating means coupled to said second conductive body, said actuating means for actuating said second conductive body to be closer to said surface than said first conductive body is to said surface; and
(b) a retraction means coupled to said second conductive body, said retraction means for retracting said second conductive body in a direction away from said surface while maintaining contact with said surface, after said second conductive body contacts said surface but before said first conductive body contacts said surface.

19. The apparatus of claim 18 wherein said retraction means rotates said second conductive body in a direction away from said surface while maintaining its contact with said surface.

20. The apparatus of claim 7 further comprising an air passageway means for directing air towards said workpiece during a surface position detecting operation, said air passageway means adjacent to said conductive bodies.

21. The apparatus of claim 7 further comprising an air passageway means for directing air between said first and second conductive bodies, said air passageway means adjacent to said conductive bodies.

* * * * *

UNITED STATES PATENT AND TRADEMARK OFFICE

CERTIFICATE OF CORRECTION

PATENT NO. : 5,941,151

DATED : August 24, 1999

INVENTOR(S) : Amon et al.

It is certified that error appears in the above-identified patent and that said Letters Patent is hereby corrected as shown below:

In column 7, line 7, change "surface," to -- surface; --.

In column 7, line 59, change "a actuated," to -- an actuated, --.

In column 8, line 36, change "opening" to -- operating --.

Signed and Sealed this

Ninth Day of May, 2000

Attest:

Q. TODD DICKINSON

*Attesting Officer*      *Director of Patents and Trademarks*